9185X
O. Merton,
Knob Screw.
Patented Oct. 17, 1835.
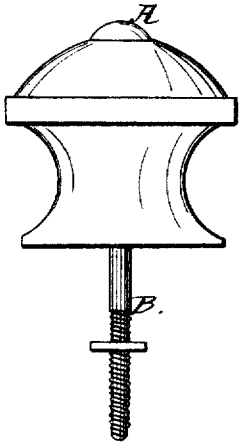
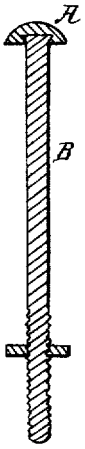
AM. PHOTO-LITHO. CO. N.Y. (OSBORNE'S PROCESS.)

Horatio B. Wade of Cincinnati Ohio

Letters Patent.

The Schedule referred to in these Letters Pattent and
making part of the same. containing a description in the words
of the said Horatio B. Wade himself of his improvement in the
Cooking Stove. —

To all to whom these presents shall come.

Be it known that I Horatio B. Wade. of Cincinnati in the
County of Hamilton and State of Ohio. have invented a new
and useful improvement in the Cooking Stove, and that the
following is a full and exact description of the construction
and operation of the said Machine as invented or improved
by me. — In shape it is either square or oblong; the top consis=
ting of a plate which has the central or interiour part thereof
removed so as to produce a narrow rim or frame all round
having the interiour circumference flanged & grooved so as
to allow another plate to be placed thereon which is to be per=
forated with openings for the Cooking vessels &c.

The bottom is composed of another plate having the
Central part throughout the length removed for the sake
of the draft for the fire. one end has in it a door as usual
which opens to near about the bottom of the grate or bars
placed for the combustion of the fuel so that I here apply
a moveable hearth, for the purpose of broiling &c. The other end has an open=
ing for the introduction of a pipe to carry off the smoke &c.
Now the sides of this stove are left open from their extremity
es some short distance within where another plate at each
side rises perpendicularly up the side of the door at one end
and all the way across (from the bottom) to the other end
(containing the pipe) where it Joins in this manner the
two

[illegible] can not be made out

9185X two ends and encloses the stove; having the upper part of each side flared or sloped outwards so as to meet or Join with the narrow rim or frame at the top plate and thereby ~~and thereby~~ form a permanent and fixed fire chest or stove into which the fuel is introduced by the door, and rest upon the bars which form somewhat less than one half of the length of the bottom plate or grate which is placed on a level with the bottom of the door and at the same time raised some distance above the bottom of the stove first described as containing the opening for the draft through the fire, so that the door occupies nearly the center of the end in which it is placed.

To each of the open sides is adjusted a reflector or oven, having the top and bottom sloped at a considerable angle the first down and the latter up from their Juncture with the top and bottom of the stove first described. The two ends and the side are perpendicular & it is Joined at the open side to that of the stove by means of hooks at the top from the stove to the reflector and the bottom rests on the bottom plate of the stove which contains the draught hole.

The reflectors are filled up in the usual manner for rotary baking oven with divisions and shelves or stew-pans as common— The whole rests upon feet or a stand—

What I claim as my own and not previously known in the above described Machine is not the central fire chamber having reflectors each side, but the manner or method by which I form my fire chamber in a permanent and fixed situation extending from one end to the other of the stove as already described. and the application of the moveable hearth to the door thereof, according to the manner I have set forth, being an improvement upon the Cooking stove heretofore patented (having a moveable fire chest and without any hearth)

In Testimony that the above is a full and exact description of my improvement as invented or improved by me, I have hereunto set my hand this twenty seventh day of August in the year eighteen hundred and thirty five.—

Witnesses
Daniel H. Meader.
R. Moorhead

Horatio B. Wade

Exd.
MGL.

928. 1vDD]